(12) United States Patent
Durbin et al.

(10) Patent No.: US 6,609,377 B2
(45) Date of Patent: Aug. 26, 2003

(54) MULTIPLE INJECTOR COMBUSTOR

(75) Inventors: Mark David Durbin, Springboro, OH (US); Hukam Chand Mongia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 10/210,298

(22) Filed: Jul. 31, 2002

(65) Prior Publication Data

US 2003/0089112 A1 May 15, 2003

Related U.S. Application Data

(62) Division of application No. 09/675,668, filed on Sep. 29, 2000.

(51) Int. Cl.[7] .................................................. F02C 1/00
(52) U.S. Cl. ......................................... 60/748; 239/405
(58) Field of Search ........................... 60/804, 737, 746, 60/747, 748, 740, 742; 239/403, 405

(56) References Cited

U.S. PATENT DOCUMENTS

| | | | |
|---|---|---|---|
| 2,551,276 A | 5/1951 | McMahan | |
| 2,968,925 A | 1/1961 | Blevans et al. | |
| 3,302,399 A | 2/1967 | Tini et al. | |
| 3,474,970 A | 10/1969 | Simmons et al. | |
| 3,630,024 A | 12/1971 | Hopkins | |
| 3,638,865 A | 2/1972 | McEneny et al. | |
| 3,899,884 A | 8/1975 | Ekstedt | |
| 3,937,011 A | 2/1976 | Caruel et al. | |
| 3,980,233 A | 9/1976 | Simmons et al. | |
| 4,105,163 A | 8/1978 | Davis, Jr. et al. | |
| 4,198,815 A | 4/1980 | Bobo et al. | |
| 4,222,243 A | 9/1980 | Mobsby | |
| 4,418,543 A | 12/1983 | Faucher et al. | |
| 4,425,755 A | 1/1984 | Hughes | |
| 4,584,834 A | 4/1986 | Koshoffer et al. | |
| 4,726,192 A | 2/1988 | Willis et al. | |
| 4,932,861 A | 6/1990 | Keller et al. | |
| 4,974,416 A | 12/1990 | Taylor | |
| 5,020,329 A | 6/1991 | Ekstedt et al. | |
| 5,121,597 A | * 6/1992 | Urushidani et al. | ........... 60/778 |
| 5,321,950 A | 6/1994 | Shekleton et al. | |
| 5,323,604 A | * 6/1994 | Ekstedt et al. | ................. 60/804 |
| 5,400,587 A | * 3/1995 | Keller et al. | ................... 60/804 |
| 5,435,884 A | 7/1995 | Simmons et al. | |
| 5,540,056 A | 7/1996 | Heberling et al. | |
| 5,680,766 A | 10/1997 | Joshi et al. | |
| 5,816,049 A | 10/1998 | Joshi | |
| 5,857,319 A | 1/1999 | Sattelmayer | |
| 6,151,898 A | 11/2000 | Hogan | |
| 6,360,525 B1 | * 3/2002 | Senior et al. | ................. 60/776 |
| 6,363,726 B1 | 4/2002 | Durbin et al. | |
| 6,405,523 B1 | * 6/2002 | Foust et al. | .................... 60/748 |
| 6,434,945 B1 | * 8/2002 | Mandai et al. | ................. 60/740 |

OTHER PUBLICATIONS

U.S. patent application Ser. No. 60/176,379, filed Jan. 14, 2000, entitled "Method and Apparatus for Decreasing Combustor Emissions."

U.S. patent application Ser. No. 09/054,794, filed Apr. 3, 1998, entitled "Anti–Carboning Fuel–Air Mixer for a Gas Turbine Engine Combustor."

* cited by examiner

*Primary Examiner*—Charles G. Freay
(74) *Attorney, Agent, or Firm*—Nate Herkamp; Sonnenschein Nath & Rosenthal

(57) ABSTRACT

A mixer for use in a combustion chamber of a gas turbine engine. The mixer includes an annular housing having an upstream end, a downstream end, a mount for attaching the housing to an upstream end of the combustion chamber, and an interior surface defining a hollow interior. The mixer also has a first swirler mounted inside the annular housing including a plurality of vanes extending inward from the housing for swirling air traveling through the housing. In addition, the mixer includes an annular fuel injector having a plurality of fuel injection ports arranged in a generally circular pattern mounted inside the first swirler for releasing droplets of fuel into swirling air downstream from the fuel injector. Further, the mixer has a second swirler mounted inside the fuel injector including a plurality of vanes extending inward from the injector for swirling air traveling through the housing downstream from the fuel injector.

16 Claims, 4 Drawing Sheets

MULTIPLE INJECTOR COMBUSTOR

The United States government has rights in this invention under Contract Nos. NAS3-26617 and NAS3-27720 awarded by the National Aeronautics & Space Administration.

BACKGROUND OF THE INVENTION

The present invention relates generally to gas turbine engine combustors, and more particularly to a combustor including a mixer having multiple injectors.

Fuel and air are mixed and burned in combustors of aircraft engines to heat flowpath gases. The combustors include an outer liner and an inner liner defining an annular combustion chamber in which the fuel and air are mixed and burned. A dome mounted at the upstream end of the combustion chamber includes mixers for mixing fuel and air. Ignitors mounted downstream from the mixers ignite the mixture so it burns in the combustion chamber.

Governmental agencies and industry organizations regulate the emission of nitrogen oxides (NOx), unburned hydrocarbons (HC), and carbon monoxide (CO) from aircraft. These emissions are formed in the combustors and generally fall into two classes, those formed due to high flame temperatures and those formed due to low flame temperatures. In order to minimize emissions, the reactants must be well mixed so that burning will occur evenly throughout the mixture without hot spots which increase NOx emissions or cold spots which increase CO and HC emissions. Thus, there is a need in the industry for combustors having improved mixing and reduced emissions.

Some prior art combustors such as rich dome combustors 10 as shown in FIG. 1 have mixers 12 which provide a rich fuel-to-air ratio adjacent an upstream end 14 of the combustor. Because additional air is added through dilution holes 16 in the combustor 10, the fuel-to-air ratio is lean at a downstream end 18 of a combustor opposite the upstream end 14. In order to improve engine efficiency and reduce fuel consumption, combustor designers have increased the operating pressure ratio of the gas turbine engines. However, as the operating pressure ratios increase, the combustor temperatures increase. Eventually the temperatures and pressures reach a threshold at which the fuel-air reaction occurs much faster than mixing. This results in local hot spots and increased NOx emissions.

Lean dome combustors 20 as shown in FIG. 2 have the potential to prevent local hot spots. These combustors 20 have two rows of mixers 22, 24 allowing the combustor to be tuned for operation at different conditions. The outer row of mixers 24 is designed to operate efficiently at idle conditions. At higher power settings such as takeoff and cruise, both rows of mixers 22, 24 are used, although the majority of fuel and air are supplied to the inner row of mixers. The inner mixers 22 are designed to operate most efficiently with lower NOx emissions at high power settings. Although the inner and outer mixers 22, 24 are optimally tuned, the regions between the mixers may have cold spots which produce increased HC and CO emissions.

SUMMARY OF THE INVENTION

Among the several features of the present invention may be noted the provision of a mixer for use in a combustion chamber of a gas turbine engine. The mixer includes an annular housing having an upstream end, a downstream end, a mount for attaching the housing to an upstream end of the combustion chamber, and an interior surface defining a hollow interior. The mixer also has a first swirler mounted inside the annular housing including a plurality of vanes extending inward from the housing for swirling air traveling through the housing. In addition, the mixer includes an annular fuel injector having a plurality of fuel injection ports arranged in a generally circular pattern mounted inside the first swirler for releasing droplets of fuel into swirling air downstream from the fuel injector. Further, the mixer has a second swirler mounted inside the fuel injector including a plurality of vanes extending inward from the injector for swirling air traveling through the housing downstream from the fuel injector.

In another aspect of the present invention, a mixer comprises an annular housing having an upstream end, a downstream end, an interior surface defining a hollow interior and a plurality of fuel injection ports for delivering droplets of fuel to the hollow interior of the mixer.

In yet another aspect, the present invention includes a combustion chamber for mixing and burning fuel and air in a gas turbine engine. The chamber includes an annular outer liner defining an outer boundary of the combustion chamber, an annular inner liner mounted inside the outer liner and defining an inner boundary of the combustion chamber, and an annular dome mounted upstream from the outer liner and the inner liner and defining an upstream end of the combustion chamber. The chamber also includes more than 100 mixers positioned on the dome.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
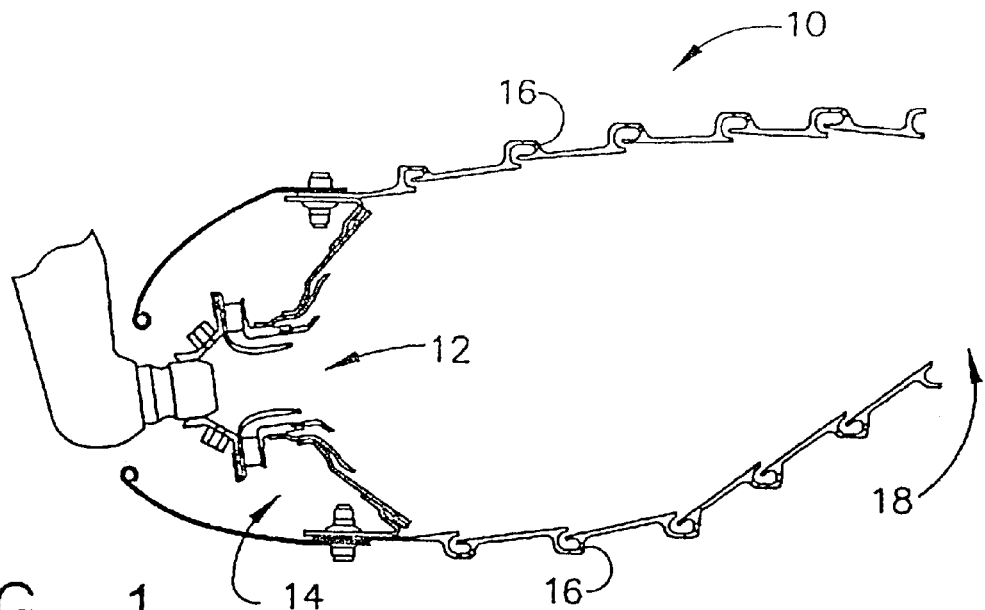
FIG. 1 is a vertical cross section of a conventional rich dome combustor.
Figure 2:
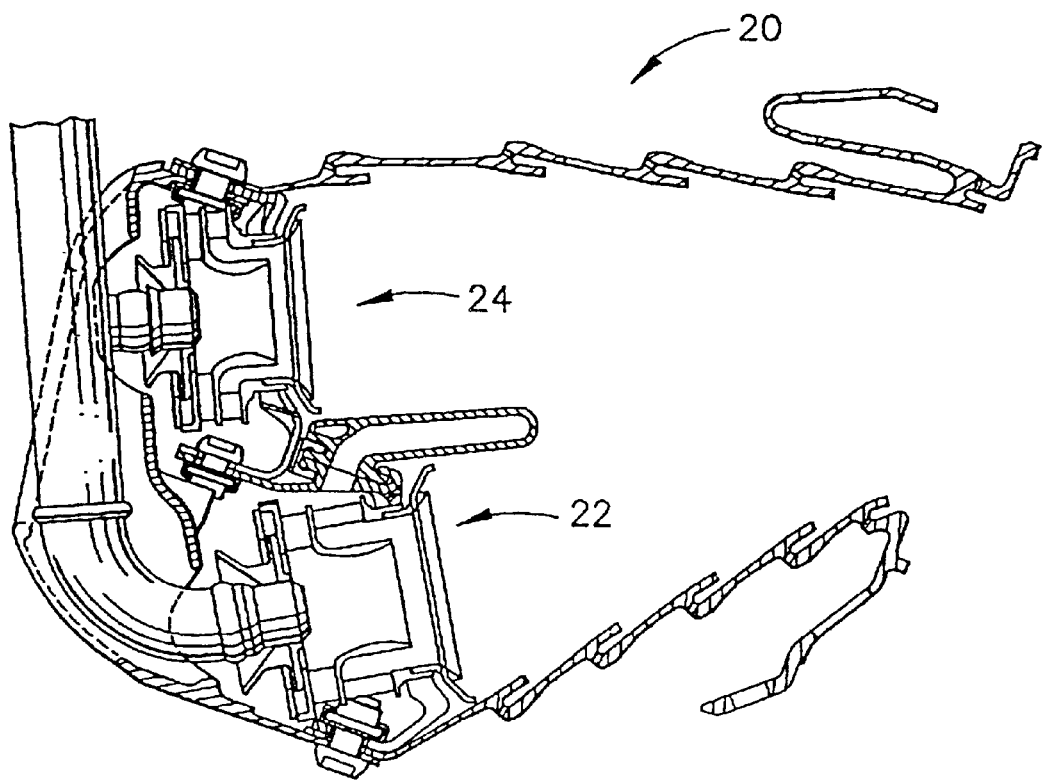
FIG. 2 is a vertical cross section of a conventional lean dome combustor.
Figure 3:
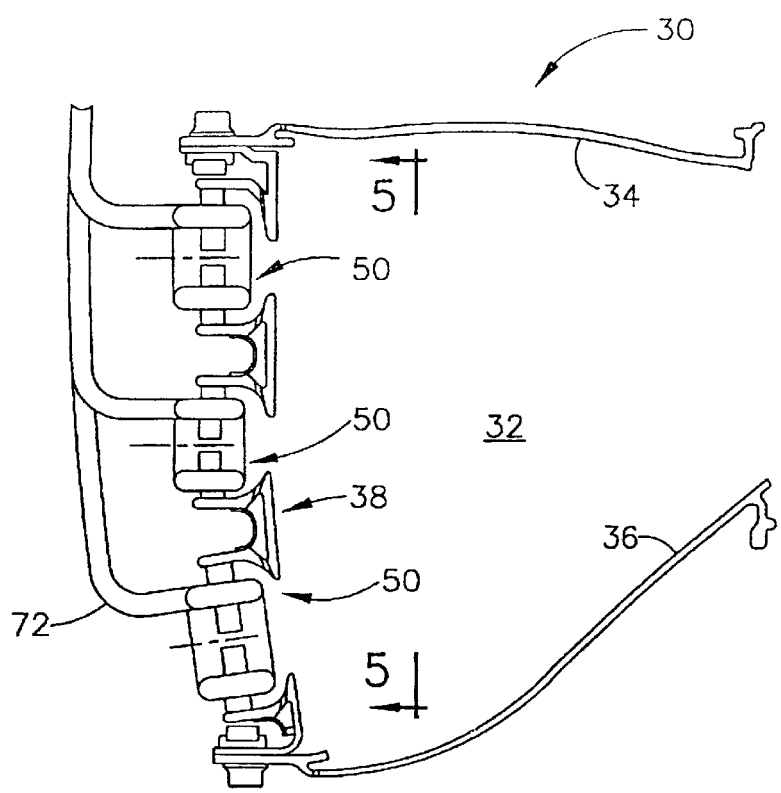
FIG. 3 is a vertical cross section of a combustor of the present invention.

Referring to the drawings and in particular to FIG. 3, a combustor of the present invention is designated in its entirety by reference number 30. The combustor 30 has a combustion chamber 32 in which combustor air is mixed with fuel and burned. The combustor 30 includes an outer liner 34 and an inner liner 36. The outer liner 34 defines an outer boundary of the combustion chamber 32, and the inner liner 36 defines an inner boundary of the combustion chamber. An annular dome, generally designated by 38, mounted upstream from the outer liner 34 and the inner liner 36 defines an upstream end of the combustion chamber 32. Mixers of the present invention, generally designated 50, are positioned on the dome 38. The mixers 50 deliver a mixture of fuel and air to the combustion chamber 32. Other features of the combustion chamber 30 are conventional and will not be discussed in further detail.

Figure 4:
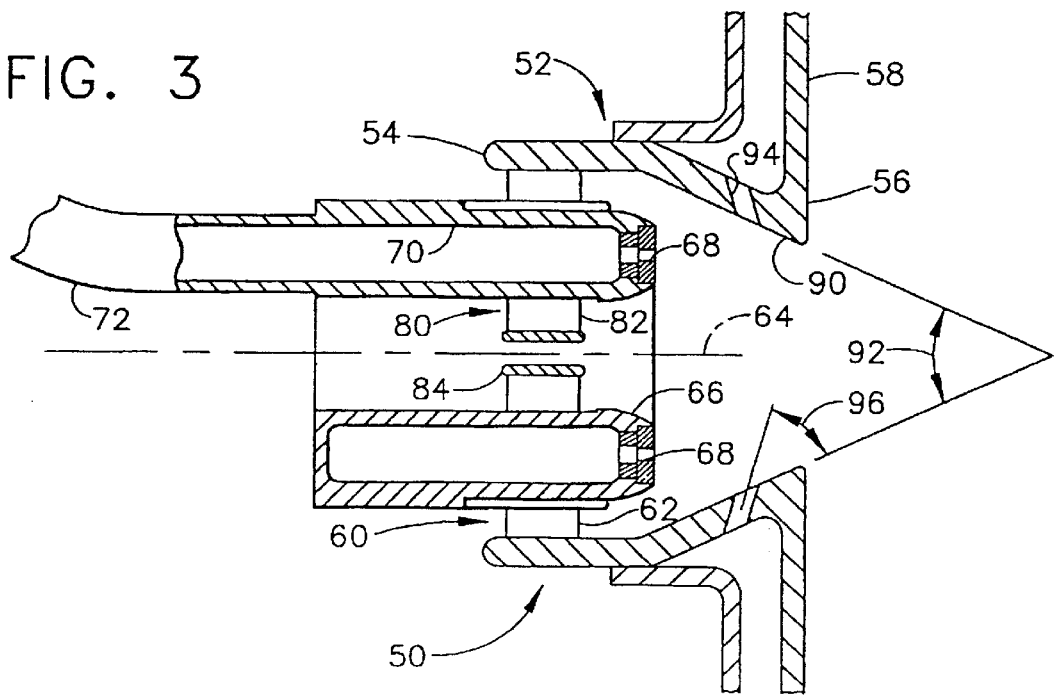
FIG. 4 is a vertical cross section of a mixer of a first embodiment of the present invention.

As illustrated in FIG. 4, each mixer 50 includes an annular housing, generally designated by 52, having an upstream end 54 and a downstream end 56 opposite the upstream end. The mixer 50 also includes a conventional mount flange 58 for attaching the downstream end 56 of the housing 52 to the dome 38. As will be appreciated by those skilled in the art, the mount flange 58 may be attached to the dome 38 by any conventional means such as welding or brazing. A first axial swirler, generally designated by 60, is mounted inside the housing 52. The swirler 60 has a plurality of vanes 62 extending radially inward from the housing 52. Each of the vanes 62 is skewed relative to the a centerline 64 of the housing for swirling air traveling through the housing from the upstream end 54 to the downstream end 56. An annular fuel injector 66 is mounted coaxially inside the first swirler 60. The injector 66 has a plurality of fuel injection ports 68 arranged in a generally circular pattern inboard from the vanes 62 of the first swirler 60 for releasing droplets of fuel into the swirling air downstream from the fuel injector. Although the fuel injection ports 68 may have other configurations without departing from the scope of the present invention, in the most preferred embodiment, the fuel injection ports have a construction similar to that described in U.S. Pat. No. 5,435,884 (which is hereby incorporated by reference) to atomize the fuel to provide superior mixing. The plurality of injection ports 68 provide fuel-air ratio uniformity. The ports 68 discharge fuel from a common annular plenum 70 fed by a conventional fuel nozzle 72. A second axial swirler, generally designated by 80, is mounted coaxially inside the fuel injector 66. The second swirler 80 includes a plurality of vanes 82 extending radially inward from the injector 66. Each of the vanes 82 is skewed relative to the a centerline 64 of the housing for swirling air traveling through the housing 52 downstream from the fuel injector. As will be understood by those skilled in the art, the vanes 62 of the first swirler 60 and the vanes 82 of the second swirler 80 may be co-swirling or counter-swirling. A tube 84 is mounted coaxially inside the second swirler 80 for directing air along the centerline 64 of the housing to prevent recirculation of air downstream from the swirlers 60, 80 and fuel injector 66.

The mixer housing 52 has converging side walls 90 downstream from the first swirler 60 to prevent air from separating from the sides as it travels through the mixer 50. Although the converging interior surfaces 90 may be separated by other angles of convergence 92 without departing from the scope of the present invention, in one preferred embodiment the converging interior surfaces are separated by an angle of convergence selected to accelerate air leaving the housing 52 to a velocity of greater than about 300 feet per second. A plurality of holes 94 is formed in the interior surface 90 of the housing 52 for introducing spent impingement cooling air from the dome 38 to the combustion chamber 32 to reduce local flame temperature and therefore lower NOx emissions. Although the cooling holes 94 may intersect the respective interior surface 90 at other angles of incidence 96 without departing from the scope of the present invention, in one preferred embodiment each of the cooling holes intersects the interior surface of the housing 52 at an angle of incidence between about 10 degrees and about 30 degrees measured in an axial plane of the housing. More preferably, the cooling holes 94 intersect the respective interior surface 90 of the housing 52 at an angle of incidence 96 of about 20 degrees measured in the axial plane of the housing. Further, each of the cooling holes 94 intersects one of the interior surfaces 90 of the housing 52 at a swirl angle (not shown) of between about 30 degrees and about 60 degrees measured in a circumferential plane of the housing. More preferably, each of the cooling holes 94 intersects the respective interior surface 90 of the housing 52 at a swirl angle of about 45 degrees measured in the circumferential plane.

Figure 5:
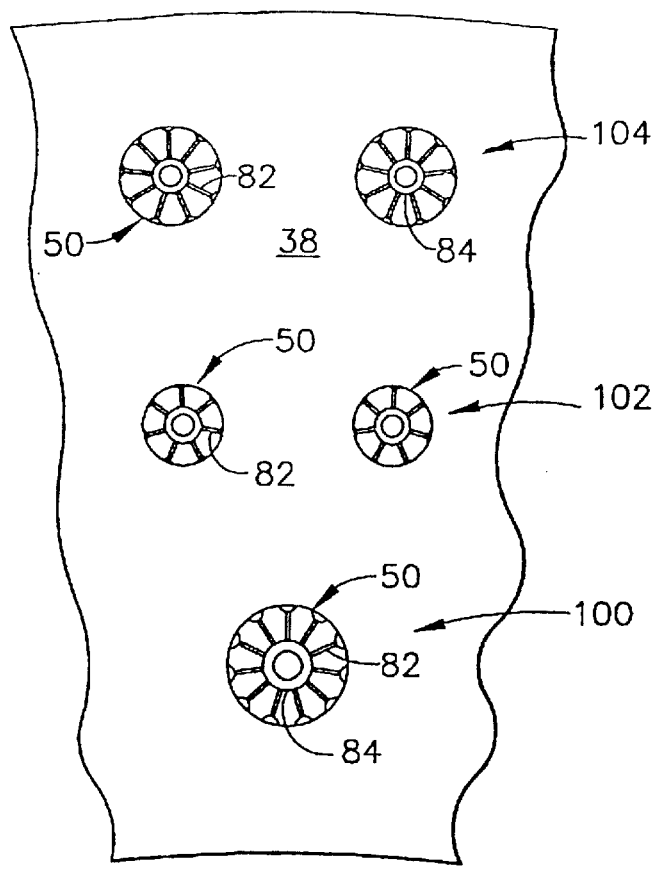
FIG. 5 is an elevation of the combustor taken in the plane of line 5—5 of FIG. 3.

As shown in FIG. 5, the mixers 50 are arranged in the combustor 30 in rows extending circumferentially around the combustor. Fuel is delivered to different mixers 50 in the combustor 30 depending upon power requirements. For example, in one embodiment when the engine is at idle, each mixer 50 in a middle row of mixers, generally designated by 102, is ignited. When more power is required, an inner row of mixers, generally designated by 100, is ignited. When still more power is required, every other mixer 50 in an outer row of mixers, generally designated by 104, is ignited. At the highest power setting such as at takeoff, all of the mixers 50 are ignited. As will be appreciated by those skilled in the art, this staging provides high local fuel-air ratios to avoid blowout and provides good low power emissions.

Figure 6:
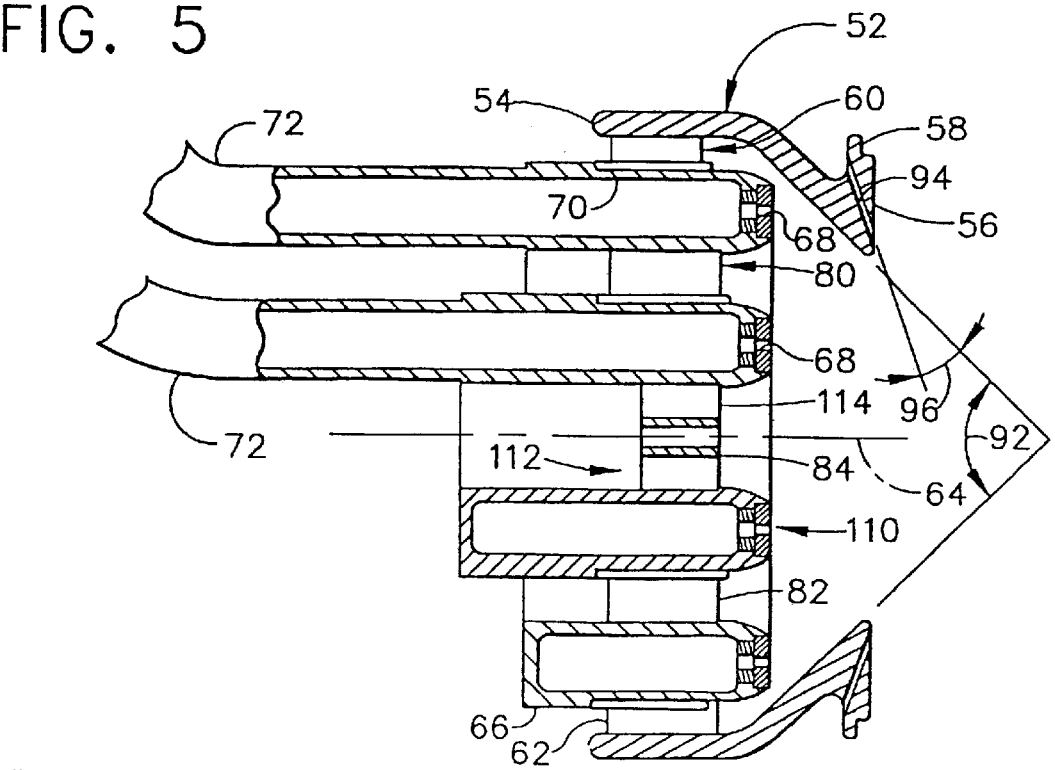
FIG. 6 is a vertical cross section of a mixer of a second embodiment of the present invention.

As illustrated in FIG. 6, a second embodiment of the mixer 50 of the present invention includes a second annular fuel injector 110 having a plurality of fuel injection ports 68 arranged in a generally circular pattern mounted inside the second swirler 80 for releasing droplets of fuel into swirling air downstream from the second fuel injector. It is envisioned that the second fuel injector 110 may be used independently from the first fuel injector 66. Further, the second embodiment of the mixer 50 includes a third axial swirler, generally designated by 112, mounted inside the second fuel injector 110. The third axial swirler 112 includes a plurality of vanes 114 extending radially inward from the second fuel injector 110. Each of the vanes 114 is skewed relative to the a centerline 64 of the housing for swirling air traveling through the housing 52 downstream from the second fuel injector. As will be appreciated by those skilled in the art, the vanes 114 of the third swirler 112 may be co-swirling or counter-swirling with respect to the vanes 82 of the second swirler 80.

Figure 7:
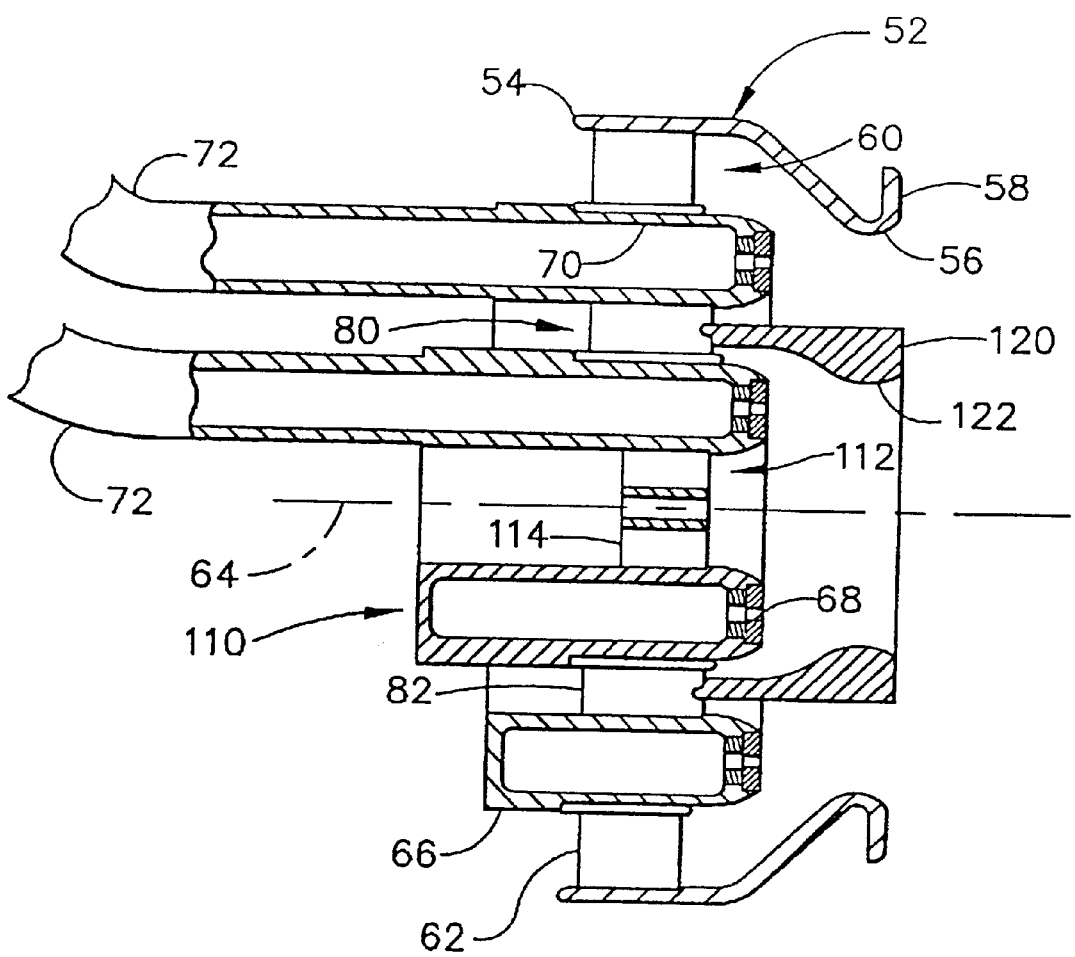
FIG. 7 is a vertical cross section of a mixer of a third embodiment of the present invention.

FIG. 7 illustrates a third embodiment of the mixer 59 of the present invention. The mixer 50 of the third embodiment is similar to the mixer of the second embodiment except that the mixer of the third embodiment has a generally cylindrical separator 120 segregating a region downstream from the first fuel injector 66 from a region downstream from the second fuel injector 110. An inside surface 122 of the separator 120 is venturi-shaped to prevent air from separating from the surface before being defused into air traveling outside of the separator. In addition, the housing 52 of the mixer 50 of the third embodiment has a different configuration than the mixer of the second embodiment.

In one embodiment, fuel staging of the mixers shown in FIGS. 6 and 7 is different than shown in FIG. 5. Rather than three rows, the mixers 30 are arranged in two rows of about 30 mixers each extending circumferentially around the combustor. At idle conditions, only the inner fuel injectors (i.e., the second injectors 110) of the outer row of mixers are fueled. At approach, only the inner injectors of both rows of mixers are fueled, and at cruise and takeoff, both fuel injectors of each mixer in both rows are fueled.

Although the mixers 50 described above may be used in other types of combustors without departing from the scope of the present invention, they are preferably used in lean dome combustors as shown. When used with such combustors, up to 85 percent of the available air travels through the dome 38 and is used in the combustion process. This allows very low flame temperatures, which in combination with the excellent mixing offered by the mixers, provides minimal NOx emissions.

The mixers 50 create a controlled vortex breakdown which dramatically increases the level of local air turbulence and hence the level of fuel-air mixing. Further, the converging interior surfaces 90 of the housing 52 delay vortex breakdown. A longer delay before vortex breakdown allows more thorough mixing outside the housing 52 and eliminates risk of auto-ignition. Further, the center tube 84 discourages auto-ignition.

As will be appreciated by those skilled in the art, a multiplicity of mixers 50 of the present invention may be used in a single dome 38. Unlike prior designs in which only 20 or 30 mixers might be used, 60 mixers or more of the present invention may be used in a dome 38. Further, in contrast to prior designs having only 1 or 2 fuel injection points in each mixer, the mixers of the present design have 8–10 injections points per mixer. Because each mixer has several (e.g., 8 to 10) injection ports 68, as many as 1200 or more separate fuel injection ports may be used in a single combustion chamber 32. This vast number of injection ports 68 provides good mixing. Further, the vast number of injection ports 68 quickly mixes the fuel and air. The short mixing time and mixer distribution maintains interaction between adjacent mixers, eliminating the need for centerbodies which are used in prior art combustors to shield adjacent mixers.

Initial testing of the mixers of the present invention indicates that they may provide a reduction in emissions. It is believed that the mixers 50 will reduce emissions to approximately 30 percent of 1996 industry standards. Further, it is believed that the mixers 50 of the present invention will reduce emissions by as much as 60 percent below current designs.

Although the mixers 50 described above may be made using other conventional manufacturing processes without departing from the scope of the present invention, the mixers of the preferred embodiment are cast and machined. Further, although the mixers may be made from other materials without departing from the scope of the prefer present invention, the mixers of the preferred embodiment are cast from Inconel® 625 metal. Inconel is a federally registered trademark of Inco Alloys International, Inc. of Huntington, W. Va.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A combustion chamber for mixing and burning fuel and air in a gas turbine engine comprising:
    an annular outer liner defining an outer boundary of the combustion chamber;
    an annular inner liner mounted inside the outer liner and defining an inner boundary of the combustion chamber;
    an annular dome mounted upstream from the outer liner and the inner liner and defining an upstream end of the combustion chamber; and
    more than 60 mixers positioned on the dome, each of said mixers comprising:
        an annular housing having an upstream end, a downstream end opposite said upstream end, a mount for attaching the housing to an upstream end of the combustion chamber, and an interior surface defining a hollow interior;
        a first swirler mounted inside the annular housing including a plurality of vanes extending inward from the housing for swirling air traveling through the housing from the upstream end to the downstream end;
        an annular fuel injector having a plurality of fuel injection ports arranged in a generally circular pattern mounted inside said first swirler for releasing droplets of fuel into swirling air downstream from said fuel injector; and
        a second swirler mounted inside the fuel injector including a plurality of vanes extending inward from the injector for swirling air traveling through the housing downstream from the fuel injector.

2. A combustion chamber as set forth in claim 1 wherein said first swirler is an axial swirler.

3. A combustion chamber as set forth in claim 1 wherein said second swirler is an axial swirler.

4. A combustion chamber as set forth in claim 1 wherein said interior surface of the annular housing converges downstream from said first swirler.

5. A combustion chamber as set forth in claim 4 wherein said interior surface converges at an angle of convergence selected to accelerate air leaving the housing to a velocity of greater than about 300 feet per second.

6. A combustion chamber mixer as set forth in claim 1 wherein the interior surface of the housing includes a plurality of holes for introducing air to the combustion chamber.

7. A combustion chamber as set forth in claim 6 wherein each of said plurality of cooling holes intersects the interior surface of the housing at an angle of between about 10 degrees and about 30 degrees measured in an axial plane of the housing.

8. A combustion chamber as set forth in claim 7 wherein each of said plurality of cooling holes intersects the interior surface of the housing at an angle of about 20 degrees measured in the axial plane of the housing.

9. A combustion chamber as set forth in claim 6 wherein each of said plurality of cooling holes intersects the interior surface of the housing at an angle of between about 30 degrees and about 60 degrees measured in a circumferential plane of the housing.

10. A combustion chamber as set forth in claim 9 wherein each of said plurality of cooling holes intersects the interior surface of the housing at an angle of about 45 degrees measured in the circumferential plane of the housing.

11. A combustion chamber as set forth in claim 1 wherein said fuel injector is a first fuel injector, and said mixer further comprises:
    a second annular fuel injector having a plurality of fuel injection ports arranged in a generally circular pattern mounted inside said second swirler for releasing droplets of fuel into swirling air downstream from said second fuel injector; and
    a third swirler mounted inside said second fuel injector including a plurality of vanes extending inward from said second injector for swirling air traveling through the housing downstream from said second fuel injector.

12. A combustion chamber as set forth in claim 11 further comprising a generally cylindrical separator segregating region downstream from the first fuel injector from a region downstream from the second fuel injector.

13. A combustion chamber as set forth in claim 1 further comprising a tube mounted inside said second swirler directing air directly along a centerline of the housing for preventing recirculation of air in the hollow interior thereof.

14. A combustion chamber for mixing and burning fuel and air in a gas turbine engine comprising:

an annular outer liner defining an outer boundary of the combustion chamber;

an annular inner liner mounted inside the outer liner and defining an inner boundary of the combustion chamber;

an annular dome mounted upstream from the outer liner and the inner liner and defining an upstream end of the combustion chamber; and more than 60 mixers positioned on the dome, each of said mixers comprising an annular housing having an upstream end, a downstream end opposite said upstream end an interior surface defining a hollow interior, a swirler mounted inside the annular housing, and a plurality of fuel injection ports positioned inside the swirler for delivering droplets of fuel to the hollow interior of the mixer.

15. A combustion chamber as set forth in claim 14 wherein said plurality of injection ports are arranged in a generally circular pattern.

16. A combustion chamber as set forth in claim 15 further comprising an axial swirler including a plurality of vanes for swirling air traveling through the housing downstream from the injection ports.

* * * * *